United States Patent [19]

Tokuhara

[11] 4,032,313
[45] June 28, 1977

[54] APPARATUS FOR PRODUCING OPTICAL FIBERS BY USING CRUCIBLES

[75] Inventor: Mituhiro Tokuhara, Yokohama, Japan

[73] Assignee: Canon Kabushiki Kaisha, Tokyo, Japan

[22] Filed: July 15, 1976

[21] Appl. No.: 705,518

Related U.S. Application Data

[63] Continuation of Ser. No. 650,062, Jan. 19, 1976, abandoned, which is a continuation of Ser. No. 510,712, Sept. 30, 1974, abandoned.

[30] Foreign Application Priority Data

Oct. 4, 1973   Japan ............................ 48-111017

[52] U.S. Cl. .................................... 65/1; 65/11 W; 65/121; 65/325; 65/333; 425/66
[51] Int. Cl.² ......................................... C03B 37/02
[58] Field of Search .......... 65/1, 2, 121, 134, 11 R, 65/11 W; 425/66

[56] References Cited

UNITED STATES PATENTS

| 1,538,229 | 5/1925 | Weaver ................................. | 65/134 |
| 2,493,260 | 1/1950 | Paquette et al. .................... | 65/134 |

FOREIGN PATENTS OR APPLICATIONS 4,528,014   12/1970   Japan ................................. 65/121

*Primary Examiner*—Robert L. Lindsay, Jr.
*Attorney, Agent, or Firm*—Toren, McGeady and Stanger

[57] ABSTRACT

An apparatus for producing an optical fiber has a plurality of crucibles piled-up one upon another, each of which has a spinnerette positioned at a bottom portion to permit the molten glass to outflow therethrough and an overflow passage positioned at a side wall. With the apparatus of the construction described which is being heated as a whole, an optical fiber is spun from the spinnerettes while the crucibles are charged with their respective molten glasses in predetermined time intervals in such rates that when the molten glasses in the crucibles exceeds predetermined levels, the excess portion of the molten glasses are permitted to overflow through the overflow passages to associated receptacles, thereby the levels of the molten glasses in the crucibles are maintained constant during the entire spinning operation and the bubbles formed in the molten glasses are caused to outflown with the excess portions to enable an optical fiber of improved quality to be spun.

2 Claims, 4 Drawing Figures

APPARATUS FOR PRODUCING OPTICAL FIBERS BY USING CRUCIBLES

This is a continuation of application Ser. No. 650,062 which was filed on Jan. 19, 1976 which, in turn is a continuation of application Ser. No. 510,711 filed on Sept. 30, 1974 both now abandoned.

BACKGROUND OF THE INVENTION

This invention relates to an improved apparatus for producing optical fibers using a multiple crucible.

The crucible method for production of an optical fiber wherein a glass material is melted by heating in a crucible and the molten glass is permitted to flow down from a spinnerette provided through the bottom wall thereof, while being spun into an optical fiber, is susceptible to the following three main factors for operation in producing a high quality fiber with uniform cross-sectional area along the entire length. (1) The viscosity of the molten glass is stabilized with time. (2) The operation of spinning a glass fiber from the spinnerette of the crucible is stabilized with time. (3) The level of the molten glass in the crucible is maintained constant during the entire spinning operation. Of these, the first factor depends upon temperature, and therefore a sufficient viscosity stabilization will be effected by the temperature control with improved accuracy. The second factor, i.e., the drawing operation can be performed with considerable stability by using an automatic spinning mechanism of the drum type. Unlike these two factors, the third factor, i.e., the maintenance of a constant level of the molten glass has theretofore been difficult to perform in practice, and therefore desired results can not be effected. This difficulty becomes serious in producing uniform fibers along the length thereof.

To improve the uniformity of optical fibers, it has been the practice of the prior art either to control the rate of material supplied continuously or intermittently in accordance with the amount of spun fiber as determined by the operator's judgement, or to control the amount of material supplied while observing the level of the molten material. The former supply control is associated with a difficulty of balancing the used-up and supply amounts with each other. In the latter connection, the molten glass as well as whole the crucible is incandescently so luminous that it is difficult to determine where the level of the molten glass is with sufficient accuracy. Thus these prior art techniques are incapable of maintaining the level of molten glass constant with sufficient accuracy during the entire spinning operation.

SUMMARY OF THE INVENTION

The present invention provides an apparatus for producing optical fibers by the crucible method which apparatus has overcome the above mentioned drawback, whereby the level of the molten material in the crucible is maintained constant in a simple fashion during the spinning operations to improve the uniformity of optical fibers, and further the bubbles formed in the molten material are prevented from entering the fiber which is being spun to improve the optical properties of the fiber. The feature which is believed to be characteristic of the invention is that the crucible having a spinnerette of flow-down type at the bottom is provided with an overflow passage arranged at an upper portion thereof so that when the crucible is charged with material in an amount slightly larger than the amount of that portion of the molten material which is flowing down from the spinnerette during the spinning operation, the excess portion of the molten material in the crucible is permitted to flow out of the crucible through the overflow passage, thereby the level of the molten material in the crucible is maintained constant during the entire spinning operation.

DESCRIPTION OF THE PREFERRED EMBODIMENTS

Figure 1:
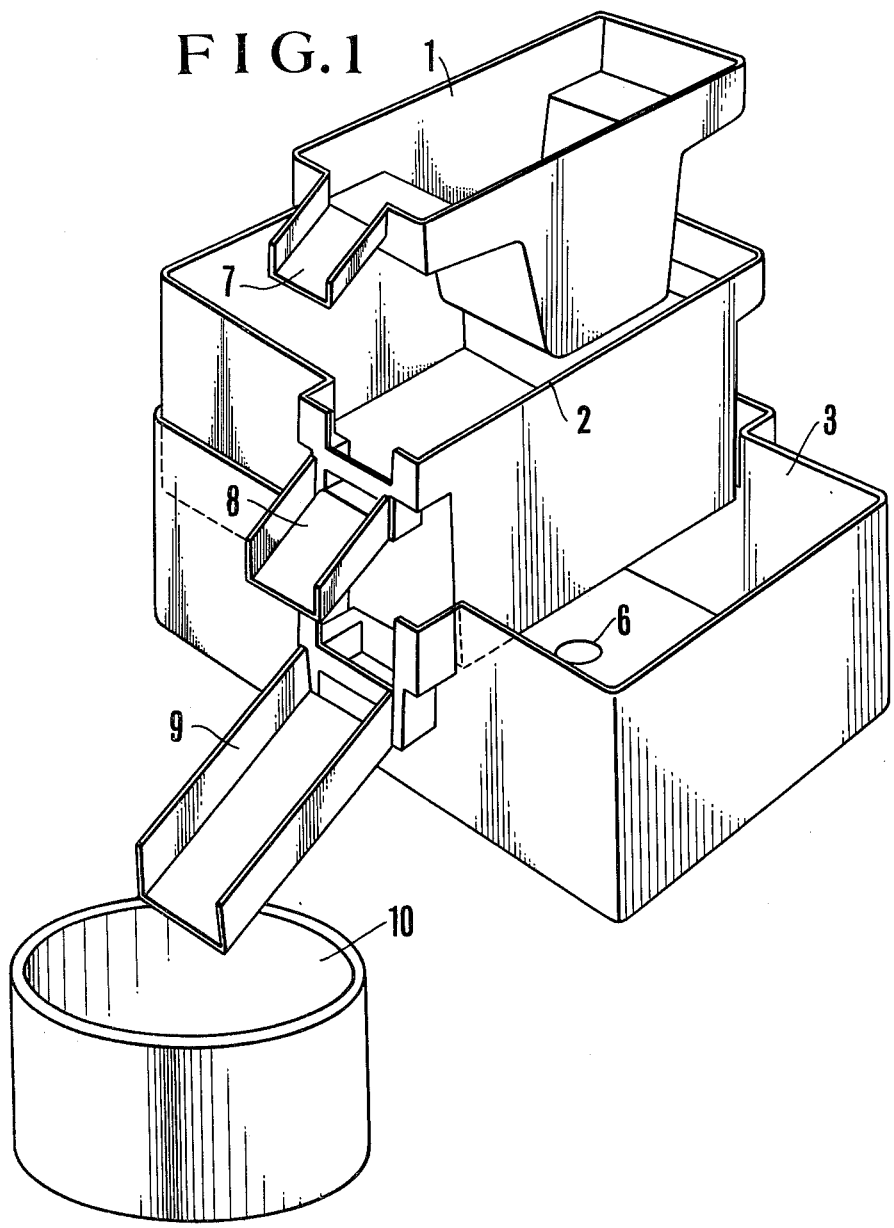
FIG. 1 is an exploded view of a multiple crucible usable in one embodiment of an apparatus in accordance with the invention.
Figure 2:
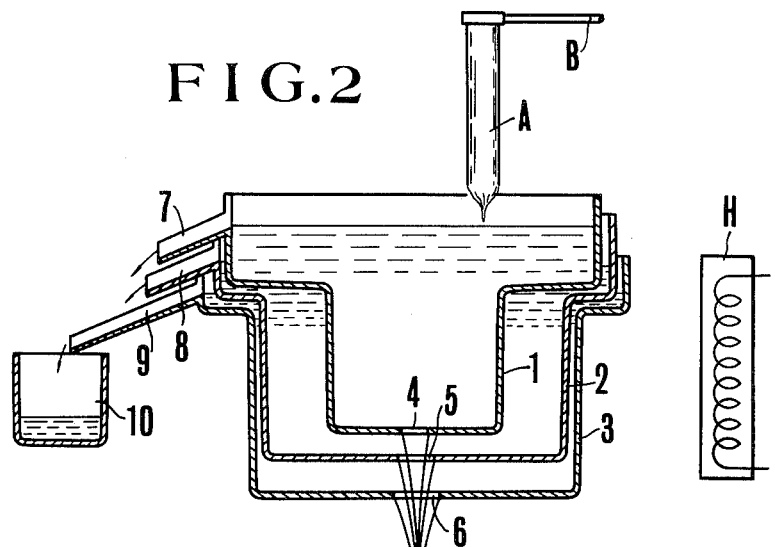
FIG. 2 is a schematic partly sectional elevational view of the apparatus including the crucible of FIG. 1.

FIGS. 1 and 2 illustrate one example of the structure of a multiple crucible usable in the apparatus for producing an optical fiber and an operative condition thereof according to the invention adapted to produce an optical fiber composed of a core, an under-coating layer having a lower refractive index than that of the core, and an overcoating acting as an absorption layer. The apparatus comprises a first crucible 1 for core material, a second crucible for under-coating material and a third crucible 3 for absorption coating material, the crucibles 1, 2 and 3 being made of platinum, clay, alumina or quartz, and being arranged in superimposed relation one upon another to provide suitable gaps between the adjacent crucibles as shown in FIG. 2. The crucibles 1, 2 and 3 have their respective one-hole spinnerettes 4, 5 and 6 provided through the bottom walls and have their respective overflow passages 7, 8 and 9 provided on upper portions. A receptacle for receiving the overflown portion of the molten material from the overflow passages 7, 8 and 9 is indicated at 10. The lower crucibles are wider than the adjacent upper ones as shown in FIG. 1 by appropriate gaps through which each of the crucibles is charged with the material.

The operation and use of the apparatus of FIGS. 1 and 2 are as follows. The individual crucibles 1, 2 and 3 initially separated from each other, are charged with their respective materials, and then superimposed one upon another, the resultant crucible assembly being shown in FIG. 2. The crucible assembly is mounted in a heating equipment such as an electric furnace and is heated as a whole to melt the charged materials. Upon completion of the melting, the molten materials are permitted to flow down from the crucibles 1, 2 and 3 through the spinnerettes 4, 5 and 6 in such a manner that the inner flowings are surrounded by the outer flowings, while being spun into an optical fiber which is being wound upon a rotating drum D. During this spinning operation, the crucibles 1, 2 and 3 are charged with the respective materials in rates slightly larger than the flowing down rates. Such a material supply can be made by a suitable technique known in the art, for example, by feeding material A in the form of a bar at a slightly larger rate than that equivalent to the flowing down rate, or by adding blocks or carets in certain time intervals, or from time to time, or by charging into the crucibles the molten materials prepared in additional crucibles. The bar A supported by a holder B affixed to a not-shown apparatus housing is melted by heating, and the molten droplets are poured into the uppermost crucibles 1. Such an excess supply of material causes the overflowing of the excess portions of the molten materials through the overflow passages, thereby the level of the molten material in each of the crucibles is maintained constant during the entire spinning operation. The arrangement of overflow passages is not limited in the direction and position to that shown in FIGS. 1 and 2. The directions of the passages may be different from each other so that the overflown portions of the molten materials are received by individual receptacles. Further there may be provided two or more overflow passages in one crucible.

Figure 3:
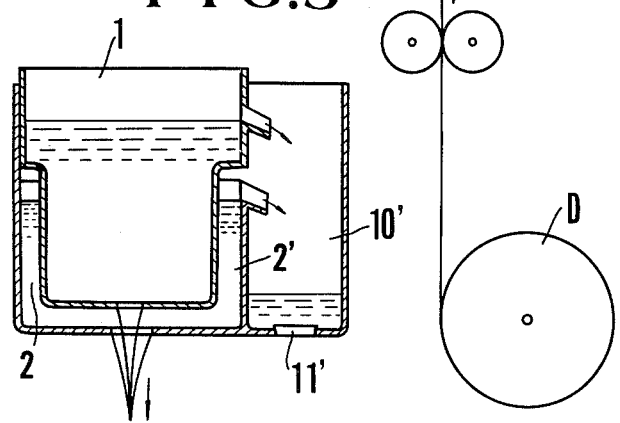
FIG. 3 and FIG. 4 are schematic sectional views illustrating alternate embodiments of the invention.

FIG. 3 illustrates another embodiment of the present invention in which the receptacle for receiving the overflown portion of the molten material is not provided in the separate form from the crucibles, but the downmost crucible is configured to provide a reservoir therefor, thereby the handling of the apparatus is facilitated. The crucible assembly of FIG. 3 is particularly adapted for use in an apparatus for producing an optical fiber composed of a core and only one coating layer. The coating material-charging crucible 2 carrying the core material-charging crucible 1 superimposed therein is configured with a division plate 2' to provide a reservoir 10' for receiving the overflown excess portion of the molten material. The reservoir 10' is preferably provided with a purging plug 11 positioned at the bottom. Although the overflown materials from the both crucibles 1 and 2 are permitted to enter the single reservoir 10', the total amount of the overflown materials during the spinning operation is relatively small so that there is no need to provide an additional reservoir.

Figure 4:
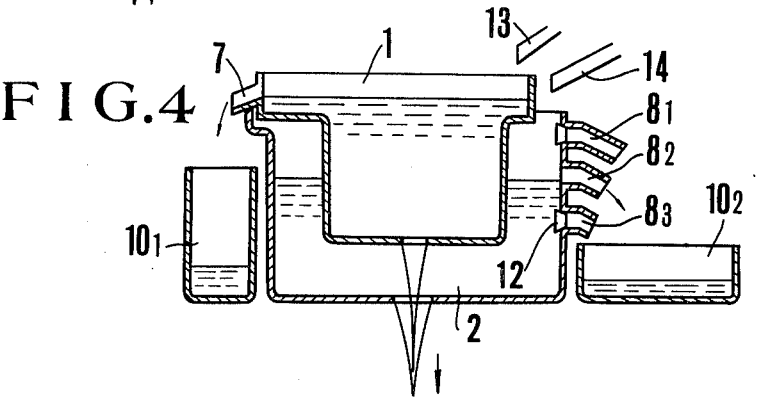

FIG. 4 illustrates still another embodiment of the present invention wherein the crucible assembly 1 and 2, for example, the lower crucible 2 is constructed so as to permit selection of levels of the molten material. Three overflow passages $8_1$, $8_2$ and $8_3$ are arranged in different heights from the bottom surface, all but one passage being closed by means of plugs 12 and the opened passage determining the desired level. A receptacle for receiving the excess portion of material overflown from the passage 7 of the first crucible 1 is indicated at $10_1$, and another receptacle for the passages $8_1$, $8_2$ and $8_3$ of the second crucible 2 is indicated at $10_2$. Nozzles through which the materials are supplied to the crucibles 1 and 2 are indicated at 13 and 14 respectively.

It will be seen from the foregoing description that according to the method of the present invention, so as long as the excess portions of the molten materials are constantly overflowing through the overflow passages of the crucibles elements, the levels of the molten materials in the crucible elements are maintained constant during the entire spinning operation more stably than in the prior art method, and consequently the liquid pressures at the spinnerette are maintained constant to permit stable production of uniform fibers. Further, the bubbles which are formed when the materials are melted tend to float up to those excess portions of the molten materials which are to be removed by the overflow from the crucibles, thereby adding the advantage of preventing bubbles from entering the fiber being spun in a simple fashion and more completely than heretofore attainable.

What is claimed is:

1. An apparatus for producing an optical fiber using crucibles which comprises:

heating means for heating materials to be melted for forming the optical fiber, a melting unit arranged to be heated by said heating means, said melting unit comprising at least two nested crucibles including an upper crucible and a lower crucible with said upper crucible positioned within said lower crucible, each said crucible comprising a bottom wall and side walls extending upwardly from said bottom wall, said bottom wall of said upper crucible spaced upwardly from said bottom wall of said lower crucible, each of said upper and lower crucibles having an upper end with an opening therein, each of said crucibles being provided with a one-hole spinnerette positioned in said bottom wall thereof, and the spinnerette holes of the crucibles being in vertically spaced alignment, overflow passage means provided in said side walls of at least one of said crucibles below the upper ends thereof and arranged so that when the molten material contained therein exceeds a predetermined level, the excess portion of the molten material is permitted to overflow therethrough, material supply means for supplying the optical fiber materials into the opening of said crucibles in amounts such that excess portions of the molten materials located above the level of said overflow passage means overflow from said overflow passage means during the entire spinning operation, wall means located exteriorly of said crucibles for receiving the overflow of molten materials from said overflow passage means, and fiber drawing means located below said spinnerette holes and arranged to spin the optical fiber while drawing those portions of the molten materials which outflow through said spinnerette holes.

2. An apparatus for producing an optical fiber using crucibles according to claim 1, wherein said overflow passage means in said side walls of said crucibles arranged in nested relation to each other include at least one said crucible with a plurality of overflow passages positioned at different heights above said respective bottom wall thereof, and plugs for said overflow passages for closing said overflow passages when not in use.

* * * * *